(12) United States Patent
Glover et al.

(10) Patent No.: US 6,698,841 B1
(45) Date of Patent: Mar. 2, 2004

(54) STRAP ADJUSTER FOR JUVENILE VEHICLE SEAT

(75) Inventors: Richard Glover, Greenwood, IN (US); Michael Scot Rosko, Greenwood, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 09/592,331

(22) Filed: Jun. 13, 2000

(51) Int. Cl.[7] .................................................. B60N 2/28
(52) U.S. Cl. ...................... 297/484; 297/250.1
(58) Field of Search ................... 297/468, 483, 297/484, 250.1; 24/198, 200

(56) References Cited

U.S. PATENT DOCUMENTS

| 779,279 | A | * | 1/1905 | Hastings ..................... 24/200 |
| 2,846,745 | A | * | 8/1958 | Lathrop ...................... 24/200 |
| 4,342,483 | A | | 8/1982 | Takada |
| 4,660,889 | A | | 4/1987 | James et al. |
| 4,826,246 | A | | 5/1989 | Meeker ................... 297/250.1 |
| 5,292,176 | A | * | 3/1994 | Artz ....................... 297/250.1 |
| 5,462,333 | A | | 10/1995 | Beauvais |
| 5,472,260 | A | * | 12/1995 | Czapski et al. ............ 297/467 |
| 5,681,094 | A | | 10/1997 | Brown et al. |
| 6,048,028 | A | | 4/2000 | Bapst |

FOREIGN PATENT DOCUMENTS

| DE | 3445497 | * | 6/1986 | ................ 297/484 |
| DE | 9421732 U1 | | 5/1996 | |

* cited by examiner

Primary Examiner—Peter R. Brown
(74) Attorney, Agent, or Firm—Barnes & Thornburg

(57) ABSTRACT

A child-restraint apparatus comprises a seat adapted to receive a seated child. An adjuster is used to permit adjustment of a strap that lies across the seated child.

22 Claims, 3 Drawing Sheets

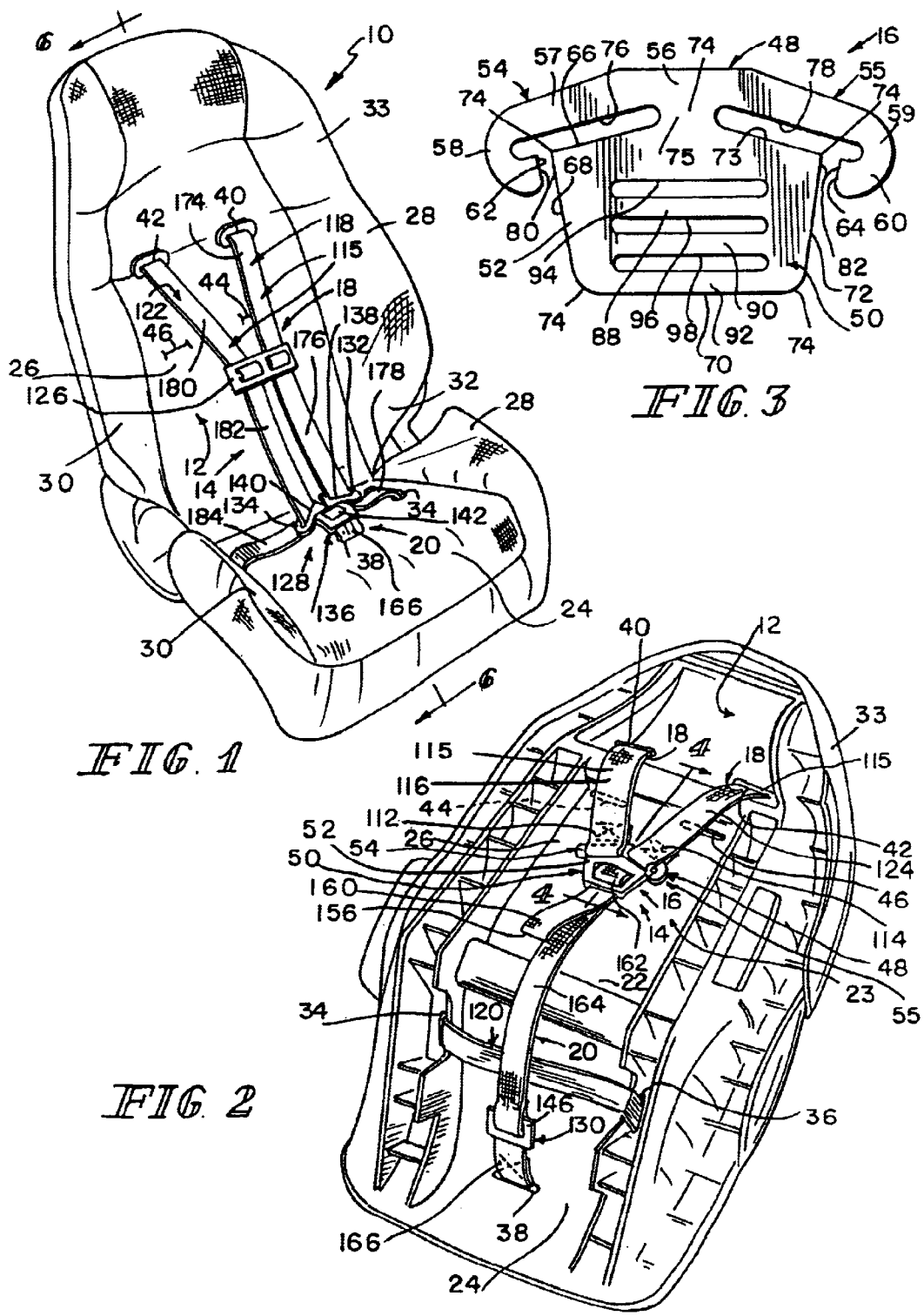

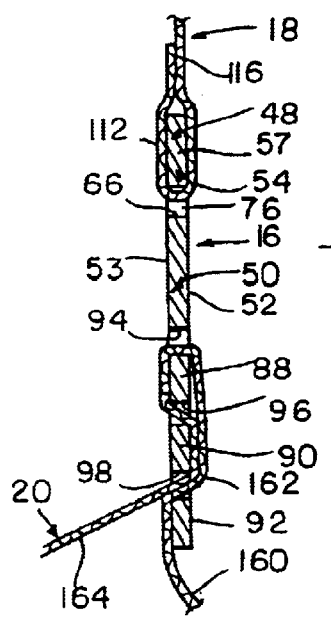
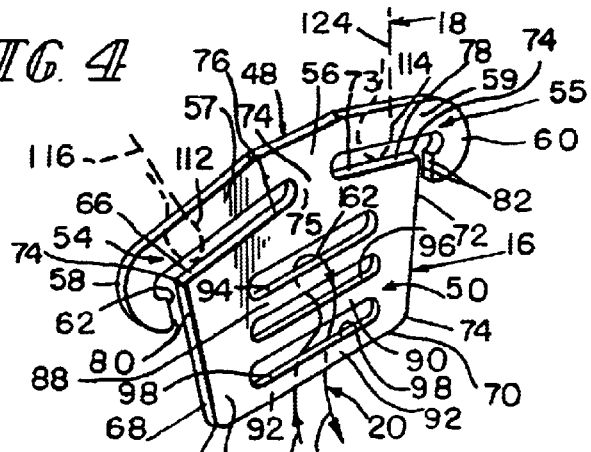
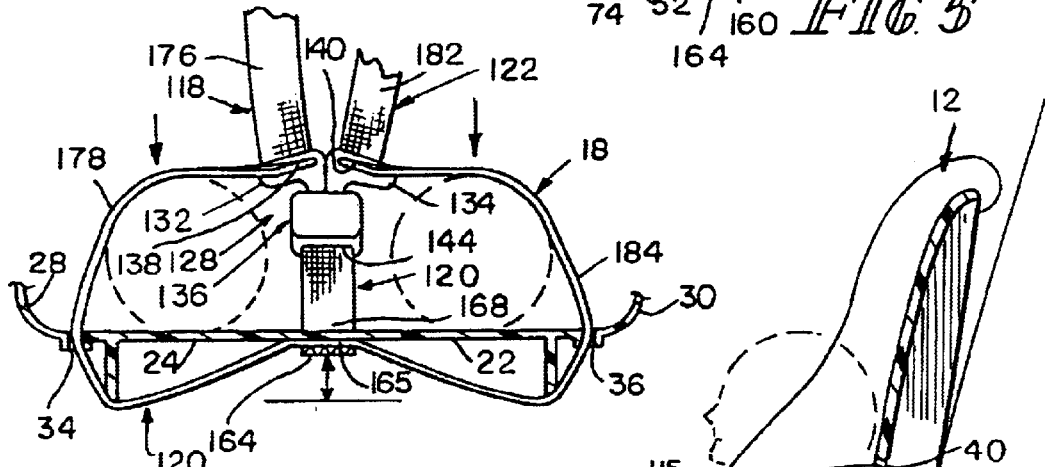
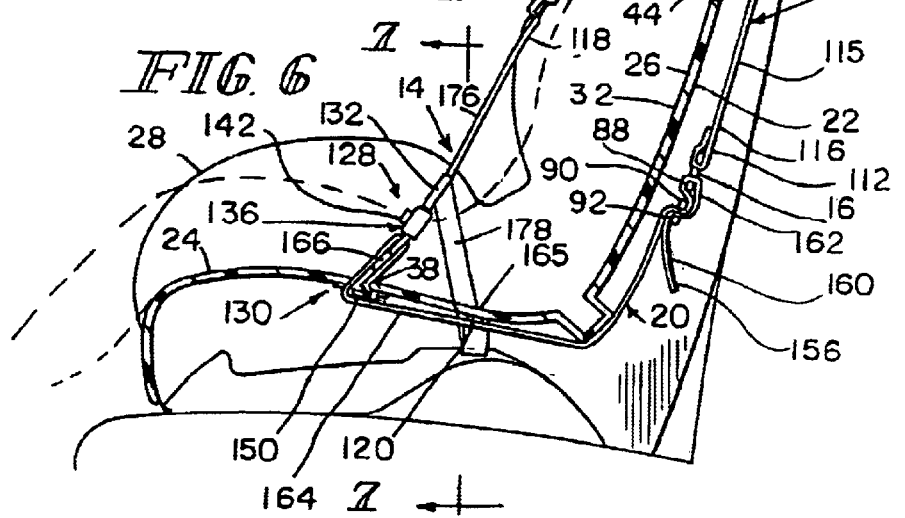

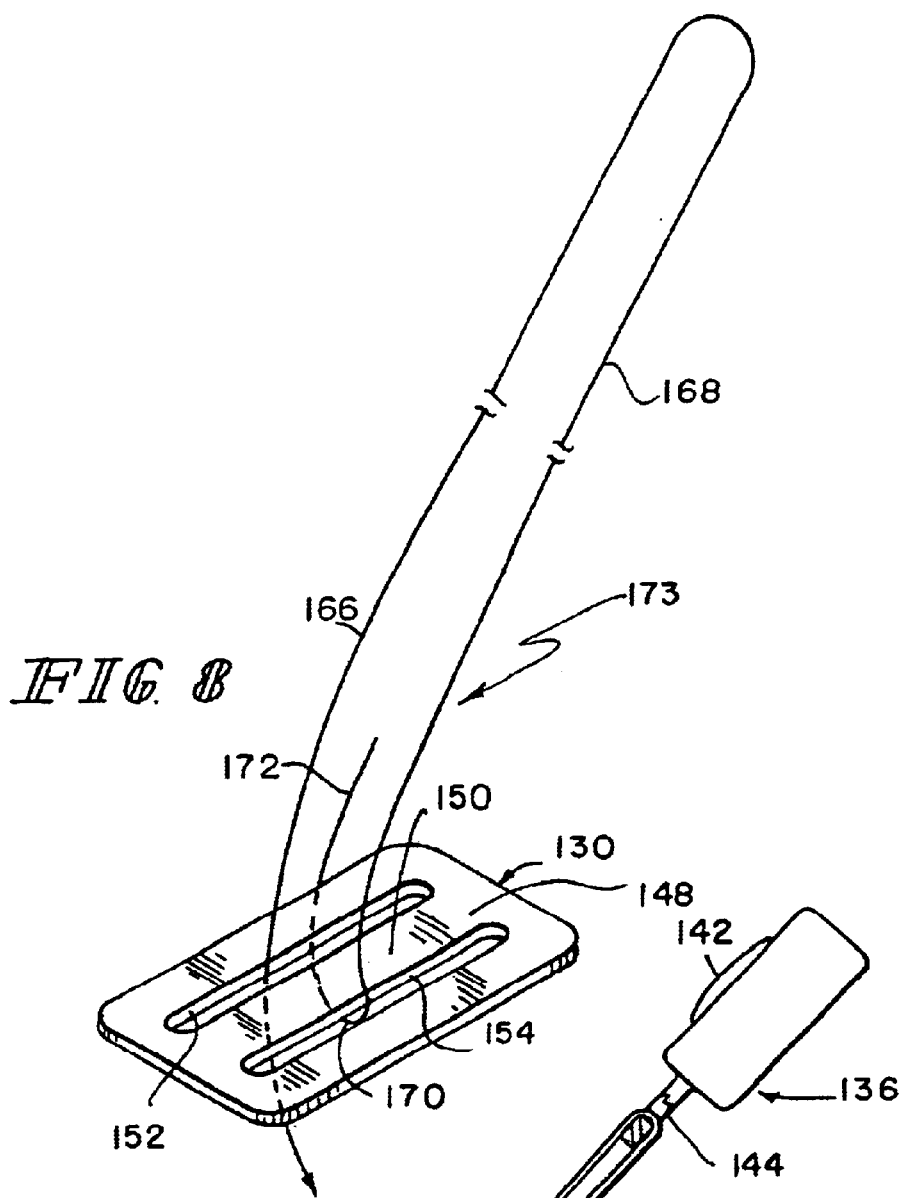
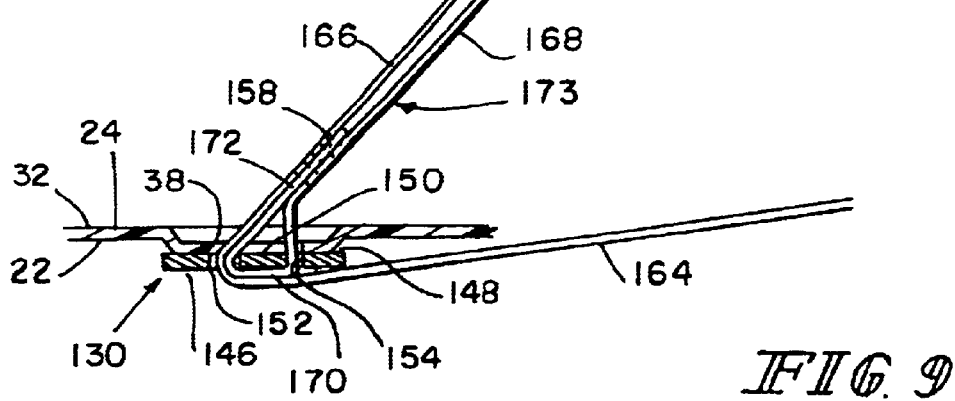

US 6,698,841 B1

STRAP ADJUSTER FOR JUVENILE VEHICLE SEAT

BACKGROUND AND SUMMARY OF THE INVENTION

The present invention relates to seats for use by children in vehicles, and particularly, to seats having a child-restraint harness. More particularly, the present invention relates to a juvenile vehicle seat having a child-restraint harness connection and adjustment mechanism.

Juvenile vehicle seats are configured to include child restraint systems. See, for example, U.S. Pat. No. 6,030,047 to Kain, U.S. Pat. No. 5,816,652 to Cone et al., U.S. Pat. No. 5,690,382 to Cone, U.S. Pat. No. 5,538,322 to Cone et al., U.S. Pat. No. 4,662,683 to Knoedler et al., and U.S. Pat. No. 4,456,302 to Knoedler et al.

According to the present invention, a child-restraint apparatus includes a seat formed to include strap-receiving slots, a restraint strap arranged to pass through some of the strap-receiving slots so that restraint portions thereof are adapted to embrace a child seated on the seat, a buckle unit coupled to the restraint portions of the restraint strap, and an adjustment strap coupled to the buckle unit and arranged to pass through another of the strap-receiving slots. The child-restraint apparatus also includes an adjuster coupled to the adjustment strap and first and second ends of the restraint strap and positioned to lie along a rearward-facing surface of the seat. The coupling of the adjustment strap and the adjuster can be changed to change the effective length of the adjustment strap between the adjuster and the buckle unit selectively to tighten or loosen the restraint portions of the restraint strap relative to a child seated on the seat so that the effective size of a child-restraint harness established along a child-seating surface of the seat can be changed to accommodate, yet snugly restrain, both larger and smaller children on the seat.

In preferred embodiments, the adjuster includes a pentagon-shaped plate formed to include slots receiving the adjustment strap therein and a C-shaped strap anchor coupled to a peak of the pentagon-shaped plate to form a first slot receiving the restraint portion that is arranged to embrace the left shoulder of a child seated on the seat and a second slot receiving the other restraint portion that is arranged to embrace the right shoulder of the seated child. The adjuster is a flat metal stamping formed to include openings into each of the first and second slots to permit each end of the restraint strap to be coupled to and uncoupled from the adjuster easily. When installed, the two portions of the restraint strap and the single portion of the adjustment strap coupled to the adjuster cooperate to define a Y-shaped strap unit along the rearward-facing surface of the seat.

Additional features of the present invention will become apparent to those skilled in the art upon consideration of the following detailed description of the invention.

BRIEF DESCRIPTION OF THE DRAWINGS

The detailed description particularly refers to the accompanying figures in which:

FIG. 1 is a front perspective view of a child-restraint apparatus showing a front side of a seat having a seat back and seat bottom and a five-point harness unit, the five-point harness unit including a buckle unit interconnecting an adjustment strap at the bottom of the buckle unit and a restraint strap arranged to embrace the left and right shoulders and legs of a child (not shown) seated on the seat;

FIG. 2 is a perspective view of a rear side of the seat of FIG. 1 showing a adjuster interconnecting, in a generally Y-shaped fashion, two segments of the restraint strap at the top of the Y and the adjustment strap at the base of the Y, the adjustment strap being slidably coupled to the adjuster to tighten or loosen the embrace of the restraint strap across the child (not shown), and further showing a strap blocker that limits movement of the adjustment strap through the seat bottom;

FIG. 3 is an enlarged plan view of the adjuster of FIG. 2 showing an upper C-shaped strap anchor portion that couples to the restraint strap and a lower pentagonally-shaped strap adjuster portion that slidably couples to the adjustment strap, the strap anchor portion including J-shaped first and second anchors, each anchor cooperating with the strap adjuster portion to define first and second slanted slots, the strap adjuster portion being arranged to form upper, middle, and lower slots and ribs for adjusting the adjustment strap;

FIG. 4 is an enlarged side elevational view of the adjuster taken along line 4—4 of FIG. 2 showing a first looped end of the restraint strap "anchored" to the first anchor, and further showing the adjustment strap having been fed through and around the slots and ribs of the strap adjuster portion;

FIG. 5 is a front perspective view of the adjuster of FIG. 3 showing the looping path of first looped end and a second looped end of the restraint strap around the first and second anchor, respectively, and further showing the looping path of the adjustment strap of FIG. 4 traversing through and around the slots and ribs of the strap adjuster portion;

FIG. 6 is an elevational view taken along line 6—6 of FIG. 1, with portions broken away, showing the left side of the seat and the restraint strap extending upwardly from the adjuster through the seat back to embrace the left shoulder and leg of a child (shown in phantom) buckled in the seat, and further showing the adjustment strap extending from the buckle unit through the seat bottom to the adjuster;

FIG. 7 is an elevational view taken along line 7—7 of FIG. 6 showing the restraint strap extending across and pushing down on a child's thighs (shown in phantom) to secure the child in the seat;

FIG. 8 is an enlarged perspective view of the strap blocker of FIG. 2 showing the strap blocker being formed to include a pair of longitudinally extending, elongated slots and including a longitudinally extending rib positioned therebetween, and further showing the looping path of the adjustment strap passing through and around the slots and rib of the strap blocker; and FIG. 9 is an enlarged side elevational view of a portion of the adjustment strap of FIG. 6 showing how the adjustment strap couples to the strap blocker and the buckle unit as it extends through an aperture of the seat bottom.

DETAILED DESCRIPTION OF THE DRAWINGS

A child-restraint apparatus 10 includes a seat 12 sized to seat a child (not shown) and a child-restraint harness or five-point harness unit 14 configured to secure the child in seat 12 as shown in FIG. 1. In particular, harness unit 14 includes an adjuster 16, a restraint strap 18 configured to embrace snugly the shoulders and thighs of the seated child, and an adjustment strap 20, as shown in FIGS. 1–3.

Restraint strap 18 and adjustment strap 20 are coupled to adjuster 16 on a rearward-facing surface or rear side 22 of seat 12 in a generally Y-shaped manner, as shown in FIG. 2, such that adjuster 16, restraint strap 18, and adjustment strap 20 cooperate to define a Y-shaped unit 23. Restraint strap 18 is arranged to form the top of the Y and adjustment strap 20 is arranged to form the base of the Y. Restraint strap 18 is detachably coupled to adjuster 16 for easily attaching and detaching restraint strap 18 to and from adjuster 16 to permit switching restraint strap 18 between a "large-child" configuration, as shown in FIG. 1, for receiving and restraining a larger child and a "small-child" configuration (not shown) for receiving and restraining a smaller child. Adjustment strap 20 is slidably coupled to adjuster 16 so that a caregiver (not shown) can adjust adjustment strap 20 and thereby tighten or loosen the embrace of the child by restraint strap 18 as the caregiver desires.

Seat 12 includes a seat bottom 24 adapted to support the child's bottom and thighs and a seat back 26 adapted to support the child's back and positioned to lie at an angle to seat bottom 24, as shown in FIGS. 1 and 6. Seat bottom 24 and seat back 26 cooperate to define first and second side walls 28, 30 that limit lateral movement of the child in seat 12. Seat bottom 24 and seat back 26 further cooperate to define a child-seating surface or front side 32 of seat 12 for receiving the child and rear side 22 of seat 12. A seat cover 33 may be provided to cover front side 32 of seat bottom 24 and seat back 26.

Seat bottom 24 is formed to include a first seat bottom strap-receiving slot or aperture 34, a second seat bottom strap-receiving slot or aperture 36 arranged to lie in spaced-apart oppositional relation to first seat bottom aperture 34, and a third seat bottom strap-receiving slot or aperture 38 arranged to lie between first and second seat bottom apertures 34, 36, as shown in FIGS. 1 and 2. First and second seat bottom apertures 34, 36 are arranged to lie adjacent to first and second side walls 28, 30, respectively.

Seat back 26 is formed to include a first upper seat back strap-receiving slot or aperture 40, a second upper seat back strap-receiving slot or aperture 42, a first lower seat back strap-receiving slot or aperture 44, and a second lower seat back strap-receiving slot or aperture 46, as shown in FIGS. 1 and 2. Upper seat back apertures 40, 42 are positioned to lie spaced apart from each other along a common horizontal axis. Similarly, lower seat back apertures 44, 46 are positioned to lie spaced apart from each other along another common horizontal axis. Lower seat back apertures 44, 46 are positioned to lie lower than upper seat back apertures 40, 42.

Seat 12 may be molded out of plastics material. Although seat 12 is a one-piece molded body in the illustrated embodiment, it is within the scope of the present disclosure to use a multiple-piece body.

Adjuster 16 is a flat metal stamping configured as a plate and includes a C-shaped strap anchor portion 48 and a pentagonally-shaped strap adjuster portion 50, as best shown in FIG. 3. Portions 48, 50 of adjuster 16 cooperate to define a flat rearward-facing surface 52 and a flat forward-facing surface 53, as shown in FIG. 4.

Strap adjuster portion 50 includes in series a first edge 66, a second edge 68, a third edge 70, a fourth edge 72, and a fifth edge 73 that cooperate to define the pentagonal shape of strap adjuster portion 50 having five peaks or vertices 74, as shown in FIGS. 3 and 5. First edge 66 is arranged to lie at about a 90° angle to second edge 68. Fifth edge 73 is arranged to lie at about a 90° angle to fourth edge 72. Second and fourth edges 68, 72 are arranged to lie in spaced-apart, non-parallel relation to each other.

Strap adjuster portion 50 further includes an upper rib 88, a middle rib 90, and a lower rib 92 and is formed to include an upper strap slot 94, a middle strap slot 96, and a lower strap slot 98, as shown in FIGS. 3 and 5. Ribs 88, 90, 92 and slots 94, 96, 98 are positioned to lie in horizontal, staggered, parallel relation to each other. Slots 94, 96, and 98 are positioned to lie between second and fourth edges 68, 72 of strap adjuster portion 50.

Strap anchor portion 48 is generally C-shaped and includes a J-shaped first anchor 54, a J-shaped second anchor 55, and a middle portion 56 that interconnects first and second anchors 54, 55 and couples strap anchor portion 48 to a vertex 74 defined by the junction of first and fifth edges 66, 74 of strap adjuster portion 50 and positioned to lie at a top portion 75 of strap adjuster portion 50. First anchor 54 extends horizontally away and slants slightly downwardly from middle portion 56 terminating at a distal end 62. First anchor 54 includes an elongated anchor leg portion 57 extending away from middle portion 56 and a U-shaped anchor hook portion 58 that curves downwardly from anchor leg portion 57 to distal end 62 and toward strap adjuster portion 50. Similarly, second anchor 55 extends horizontally away, but in the opposite direction relative to first anchor 54, and slants slightly downwardly from middle portion 56 terminating at a distal end 64. Second anchor 55 includes an elongated anchor leg portion 59 extending away from middle portion 56 and a U-shaped anchor hook portion 60 that curves downwardly from anchor leg portion 59 to distal end 64 and toward strap adjuster portion 50.

First edge 66 of strap adjuster portion 50 and first anchor 54 cooperate to define a first slanted slot 76, as shown in FIGS. 3 and 5. Similarly, fifth edge 74 of strap adjuster portion 50 and second anchor 55 cooperate to define a second slanted slot 78.

Distal end 62 of first anchor 54 is positioned to lie spaced apart from second edge 68 of strap adjuster portion 50 so that distal end 62 and second edge 68 cooperate to define a first opening 80, which extends transverse to and opens into first slanted slot 76. Similarly, distal end 64 of second anchor 55 is positioned spaced apart from fourth edge 72 of strap adjuster portion 50 so that distal end 64 and fourth edge 72 cooperate to define a second opening 82, which extends transverse to and opens into second slanted slot 78.

Restraint strap 18 is removably coupled to adjuster 16 in either the "large-child" configuration, as shown in FIGS. 1, 2, and 6, or the "small-child" configuration (not shown). In the "large-child" configuration, restraint strap 18 passes through upper seat back apertures 40, 42, whereas, in the "small-child" configuration, restraint strap 18 passes through lower seat back apertures 44, 46. In both configurations, restraint strap 18 also passes through first and second seat bottom apertures 34, 36.

Restraint strap is arranged to form a first end or loop 112, a second end or loop 114, and a strap portion 115 extending therebetween, as shown in FIG. 2. First loop 112 is detachably coupled to first anchor 54 so that first anchor 54 holds first loop 112 firmly when the child is restrained in seat 12 and a caregiver can detach first loop 112 easily from first anchor 54 for adjustment. Similarly, second loop 114 is detachably coupled to second anchor 55 so that second anchor 55 holds second loop 114 firmly when the child is restrained in seat 12 and a caregiver can detach second loop 114 easily from second anchor 55 for adjustment. Specifically, first loop 112 extends around anchor leg portion 57 of first anchor 54 as first loop 112 couples to first slanted slot 76. Anchor hook portion 58 of first anchor 54 prevents first loop 112 from inadvertently slipping off anchor leg portion 57 of first anchor 54. Similarly, second loop 114 extends around anchor leg portion 59 of second anchor 55 as second loop 114 couples to second slanted slot 78. Anchor hook portion 60 of second anchor 55 prevents second loop 114 from inadvertently slipping off anchor leg portion 59 of second anchor 55.

Restraint strap 18 conveniently can be thought of as being partitioned into five segments arranged in series and extending "end-to-end" from first loop 112 of restraint strap 18 to second loop 114 of restraint strap 18, as shown in FIGS. 1 and 2. Referring to the large child configuration, a first segment 116 includes first loop 112 and slants upwardly along rear side 22 of seat 12 from anchor leg portion 57 of first anchor 54 to first upper seat back aperture 40. A first restraint portion or second segment 118 extends downwardly along front side 32 of seat 12 from first upper seat back aperture 40 to first seat bottom aperture 34. A third segment 120 extends along rear side 22 of seat 12 under seat bottom 24 from first seat bottom aperture 34 to second seat bottom aperture 36. A second restraint portion or fourth segment 122 extends upwardly along front side 32 of seat 12 from second seat bottom aperture 36 to second upper seat back aperture 42. A fifth segment 124 includes second loop 114 and slants downwardly along rear side 22 of seat 12 from second upper seat back aperture 42 to anchor leg portion 59 of second anchor 55.

First and fifth segments 116, 124 cooperate to form the top of Y-shaped unit 23 as each of first and fifth segments 116, 124 extends from respective seat back aperture 40, 42, 44, 46 to respective anchor 54, 55. First and second anchors 54, 55 and first and second slanted slots 84, 85 of adjuster 16 angle slightly downwardly to accommodate the top of the Y shape formed by first and fifth segments 116, 124, as shown in FIG. 3. Similarly, the pentagonal shape of strap adjuster portion 50 accommodate the top of the Y shape as first and fifth edges 66, 74 of strap adjuster portion 50 cooperate with strap anchor portion 48 to define first and second slanted slots 76, 78.

Although the partitions of restraint strap 18 have been described with reference to the "large-child" configuration, it is within the scope of this disclosure that such partitions could be used to describe restraint strap 18 positioned in the "small-child" configuration. The only difference is that restraint strap 18 extends through first and second lower seat back apertures 44, 46 in the "small-child" configuration.

A caregiver can switch restraint strap 18 easily between the "large-child" configuration and the "small-child" configuration. To switch from the "large-child" configuration to the "small-child" configuration, first loop 112 of restraint strap 18 is detached from first anchor 54 by removing from first slanted slot 76 through first opening 80. First loop 112 is slid off anchor leg portion 57 of first anchor 54, around anchor hook portion 58 of first anchor 54, and through first opening 80 so that first loop 112 is free from adjuster 16. Similarly, second loop 114 of restraint strap 18 is detached from second anchor 55 by removing from second slanted slot 78 through second opening 82. Second loop 114 is slid off anchor leg portion 59 of second anchor 55, around anchor hook portion 59 of second anchor 55, and through second opening 82 so that second loop 112 is free from adjuster 16.

First and second loops 112, 114 are then pulled through first and second upper seat back apertures 40, 42, respectively, to front side 32 of seat 12. First and second loops 112, 114 are fed through first and second lower seat back apertures 44, 46, respectively, to rear side 22 of seat 12. Finally, first and second loops 112, 114 are reattached to first and second anchors 54, 55, respectively, following the reverse of the procedure described above for detaching loops 112, 114 from anchors 54, 55 to complete the switch to the "small-child" configuration. To switch restraint strap 18 back to the "large-child" configuration, this overall procedure is followed in reverse. While switching restraint strap 18 between the "large-child" and "small-child" configurations, restraint strap 18 remains coupled to first and second seat bottom apertures 34, 36.

Harness unit 14 further includes a rectangular strap retainer 126, a buckle unit 128, and a rectangular strap blocker 130, as shown in FIGS. 1 and 2. Strap retainer 126 is adapted to lie across the chest of the child and to slidably couple to second and fourth segments 118, 122 of restraint strap 18 to interconnect second and fourth segments 118, 122 of restraint strap 18 and aid in restraining the child in seat 12, as shown in FIG. 1.

Strap retainer 126 includes a cantilever post (not shown) to which fourth segment 122 is coupled when the child is restrained in seat 12. Fourth segment 122 is coupled easily to and removed from strap retainer 126 by sliding fourth segment 122 on and off of the cantilever post. Strap retainer 126 further includes a fixed post to which second segment 118 is coupled. Second segment 118 is coupled to strap retainer 126 by feeding first loop 112 of restraint strap 18 through strap retainer 126 across the fixed post. Second segment 118 is removed from strap retainer 126 by pulling first loop 112 back through strap retainer 126 across the fixed post.

When the child is secured in seat 12, fourth segment 122 is coupled to strap retainer 126 by sliding fourth segment 122 onto the cantilever post while second segment 118 is coupled to the fixed post so that both second and fourth segments 118, 122 are coupled to strap retainer 126. In this configuration, a caregiver can slide strap retainer 126 back and forth along second and fourth segments 118, 122 of restraint strap 18 to the desired position. When the child is removed from seat 12, fourth segment 122 is slid off the cantilever post thereby separating fourth segment 122 from strap retainer 126 which remains coupled to second segment 118.

Buckle unit 128 couples restraint strap 18 to adjustment strap 20 on front side 32 of seat 12 and includes a first latch plate 132, a second latch plate 134, and a latch member 136, as shown in FIGS. 1 and 7. First latch plate 132 is formed to include an aperture 138 and second latch plate 134 is formed to include an aperture 140. First latch plate 132 slidably couples to second segment of restraint strap 18 such that second segment 118 passes through aperture 138 of first latch plate 132. Similarly, second latch plate 134 slidably couples to fourth segment 122 of restraint strap 18 such that fourth segment 122 passes through aperture 140 of second latch plate 134. Latch plates 132, 134 buckle to latch member 136. Latch member 136 includes a release button 142 that a caregiver can depress to unbuckle latch plates 132, 134 from latch member 136. Latch member 136 further includes an aperture 144 through which adjustment strap 20 passes to couple adjustment strap 20 to latch member 136.

Strap blocker 130 is coupled to adjustment strap 20 to limit movement of adjustment strap 20 through third seat bottom aperture 38. Strap blocker 130 includes a rearward-facing surface 146 and a forward-facing surface 148 that abuts rear side 22 of seat bottom 24 adjacent to third seat bottom aperture 38 when restraint strap 18 and adjustment strap 20 are taut as when the child is secured in seat 12, as shown in FIGS. 8 and 9. Forward-facing surface 148 of strap blocker 130 may become spaced apart from seat bottom 24 when restraint strap 18 and adjustment strap 20 become slack as may occur when the child is removed from seat 12. Strap blocker 130 further includes a longitudinal rib 150 and is formed to include first and second slots 152, 154 that are positioned to lie longitudinally along either side of rib 150 and in parallel relation to each other.

Adjustment strap 20 includes a first end 156 and a second end 158. Similar to the partitioning of restraint strap 18, adjustment strap 20 conveniently can be thought of as being partitioned into seven segments arranged "end-to-end" in series, as shown in FIGS. 2, 4, 6, and 9. A first segment 160 extends freely along rear side 22 of seat 12 from first end 156 of adjustment strap 20 to strap adjuster portion 50 of adjuster 16. A second segment 162 slidably couples to strap adjuster portion 50 of adjuster 16 as it extends from first segment 160 through and around slots 94, 96, 98 and ribs 88, 90, 92 of strap adjuster portion 50 to a third segment 164 as explained below.

Third segment 164 extends along rear side 22 of seat 12 from second segment 162 to first slot 152 of strap blocker 130. Third segment 164 of adjustment strap 20 is arranged to form the base of Y-shaped unit 23. Third segment 164 of adjustment strap 20 crosses over third segment 120 of restraint strap 18 in a generally perpendicular fashion along rear side 22 of seat 12 such that third segment 120 of restraint strap 18 is positioned to lie between seat bottom 24 and third segment 164 of adjustment strap 20. As a result, when third segment 164 of adjustment strap 20 is tightened, third segment 164 of adjustment strap 20 presses a middle portion 165 of third segment 120 of restraint strap 18 toward seat bottom 24 to help tighten second and fourth segments 118, 122 of restraint strap 18. At the same time, middle portion 165 of third segment 120 of restraint strap 18 may abut seat bottom 24, as shown in FIG. 7, although middle portion 165 may also be spaced apart from seat bottom 24. It is understood that third segment 164 of adjustment strap 20 may be positioned to lie between seat bottom 24 and third segment 120 of restraint strap 18.

Adjustment strap 20 further includes a fourth segment 166, a fifth segment 168, a sixth segment 170, and a seventh segment 172, as shown in FIG. 9. Fourth segment 166 extends through and from first slot 152 of strap blocker 130 through third seat bottom aperture 38 to front side 32 of seat 12 and through aperture 144 of latch member 136. Fifth segment 168 extends from aperture 144 of latch member 136 back through third seat bottom aperture 38 to rear side 22 of seat 12 and first slot 152 of strap blocker 130. Sixth segment 170 extends from fifth segment 168 through first slot 152 of strap blocker 130 across rearward-facing surface 146 of rib 150 of strap blocker 130 and through second slot 154 of strap blocker 130. Seventh segment 172 extends from second slot 154 of strap blocker 130 to second end 158. Second end 158 is positioned to lie between and is fixedly coupled to fourth and fifth segments 166, 168 of adjustment strap 20 so that fourth, fifth, sixth, and seventh segments 166, 168, 170, 172 cooperate to form a loop 173, as shown in FIGS. 8 and 9. Illustratively, fourth and fifth segments 166, 168 and second end 158 are stitched together.

Second segment 162 of adjustment strap 20 loops around and through ribs 88, 90, 92 and slots 94, 96, 98 of strap adjuster portion 50 of adjuster 16, as shown in FIG. 4 and by the arrow of FIG. 5, from first segment 160 of adjustment strap 20 to third segment 164 of adjustment strap 20. Sequentially, second segment 162 extends initially along forward-facing surface 53 of lower rib 92 through lower slot 98 to rearward-facing surface 52 of middle rib 90. Second segment 162 then extends across rearward-facing surface 52 of middle rib 90 and skips over middle slot 96 to rearward-facing surface 52 of upper rib 88. At that point, second segment 162 wraps around upper rib 88 as second segment 162 extends across rearward-facing surface 52 of upper rib 88 and through upper slot 94 to forward-facing surface 53 of upper rib 88. Second segment 162 completes the "wrap" of upper rib 88 as it extends past forward-facing surface 53 of upper rib 88 through middle slot 96 back to rearward-facing surface 52 of middle rib 90. Second segment 162 then abuts itself as it extends along rearward-facing surface 52 of middle rib 90 and back through lower slot 98 toward forward-facing surface 53 of lower rib 92 and third segment 164.

Second segment 162 of adjustment strap 20 is slidably coupled to strap adjuster portion 50 of adjuster 16 in the manner described above to permit adjustment of the relative "lengths" of first and third segments 160, 164 of adjustment strap 20 and first, second, fourth, and fifth segments 116, 118, 122, 124 of restraint strap 18 for selectively tightening or loosening the embrace of restraint strap 18 across the child. To tighten the embrace of the child, the "lengths" of second and fourth segments 118, 122 of restraint strap 18 must be shortened. To accomplish this, a caregiver slides adjustment strap 20 through and around slots 94, 96, 98 and ribs 88, 90, 92 of strap adjuster portion 50 of adjuster 16 to lengthen first segment 160 of adjustment strap 20 and thereby shorten and tighten third segment 164 of adjustment strap 20. As a result, first and second anchors 54, 55 pull first and second loops 112, 114 of restraint strap 18 downwardly to lengthen and tighten first and fifth segments 116, 124 of restraint strap 18 and thereby shorten and tighten second and fourth segments 118, 122 of restraint strap 18. At the same time, forward-facing surface 148 of strap blocker 130 abuts rear side 22 of seat bottom 24 adjacent to third seat bottom aperture 38 to limit movement of adjustment strap 20 through third seat bottom aperture 38 to front side 32. Additionally, in this tightened configuration, a substantial portion of fourth and fifth segments 166, 168 of adjustment strap 20 is positioned to lie along front side 32 of seat 12.

Conversely, to loosen the embrace of the child, the "lengths" of second and fourth segments 118, 122 of restraint strap 18 must be lengthened. To do so, a caregiver slides adjustment strap 20 through and around slots 94, 96, 98 and ribs 88, 90, 92 of strap adjuster portion 50 of adjuster 16 to shorten first segment 160 of adjustment strap 20 and thereby lengthen third segment 164 of adjustment strap 20.

As a result, slack develops in third segment 164 of adjustment strap 20. A caregiver then pulls on second and fourth segments 118, 122 of restraint strap 18 from front side 32 of seat 12 so that the slack in third segment 164 is pulled through seat back 26 and develops in second and fourth segments 118, 122 of restraint strap 18. As the caregiver pulls the slack therethrough, the "lengths" of first and fifth segments 116, 124 of restraint strap 18 accordingly shorten. At the same time, most of fourth and fifth segments 166, 168 of adjustment strap 20 may also be pulled to rear side 22 of seat 12 through third seat bottom aperture 38 causing strap blocker 130 to become spaced apart from seat bottom 24. Latch member 136 prohibits fourth and fifth segments 166, 168 of adjustment strap 20 from being pulled all the way through third seat bottom aperture 38 to rear side 22.

Third segment 164 of adjustment strap 20 represents the effective length of adjustment strap 20 since selectively increasing or decreasing the length of third segment 164 either loosens or tightens restraint strap across the seated child, respectively. Adjustment strap 20 tethers adjuster 16 in a selected position along rear side 22 upon sliding movement of second segment 162 of adjustment strap 20 relative to adjuster 16 to change the effective length of adjustment strap 20.

In use, before a child is placed in seat 12, a caregiver decides whether the "large-child" or "small-child" configuration is desired and accordingly positions restraint strap 18 through upper or lower seat back apertures 40, 42, 44, 46, as described above.

To secure the child in seat 12 as shown in FIG. 6, the caregiver "opens" harness unit 14 in order to receive the child in seat 12 by detaching fourth segment 122 of restraint strap 18 from strap retainer 126 and depressing release button 142 of latch member 136 to unbuckle latch plates 132, 134 from latch member 136. Second and fourth segments 118, 122 of restraint strap 18 are spread sufficiently apart from each other to place the child therebetween.

The child is placed in seat 12 between second and fourth segments 118, 122 of restraint strap 18 so that the child's bottom and upper legs rest on seat bottom 24 and seat back 26 supports the child's back. Second and fourth segments 118, 122 of restraint strap 18 are draped across the front of the child's shoulders. If second and fourth segments 118, 122 of restraint strap 18 are not long enough to lay across the child's shoulders, the caregiver can lengthen second and fourth segments 118, 122 of restraint strap 18 at adjuster 16 according to the procedure set forth above for loosening the embrace of the child. Once the child is positioned in seat 12 with second and fourth segments 118, 122 of restraint strap 18 draped across the child's shoulders, latch plates 132, 134 are buckled to latch member 136 and fourth segment 122 of restraint strap 18 is coupled to strap retainer 126. If necessary, the caregiver slides strap retainer 126 along second and fourth segments 118, 122 of restraint strap 18 to the desired position. The caregiver then tightens second and fourth segments 118, 122 of restraint strap 18 at adjuster 16 according to the procedure set forth above for tightening the embrace of the child so that second and fourth segments 118, 122 of restraint strap 18 snugly embrace the child.

Second and fourth segments 118, 122 of restraint strap 18 can be "subdivided" into sections to help illustrate the operation of restraint strap 18 in the secured configuration. Second segment 118 of restraint strap 18 includes a left shoulder section 174 extending across the left shoulder of the child from first upper or lower seat back aperture 40, 44 (whichever the case may be) to strap retainer 126, a left side section 176 extending along the left side of the child from strap retainer 126 to first latch plate 132, and a left leg section 178 pushing down on and extending across the left leg of the child from first latch plate 132 to first seat bottom aperture 34. Similarly, fourth segment 122 of restraint strap 18 includes a right shoulder section 180 extending across the right shoulder of the child from second upper or lower seat back aperture 42, 46 (whichever the case may be) to strap retainer 126, a right side section 182 extending along the right side of the child from strap retainer 126 to second latch plate 134, and a right leg section 184 pushing down on and extending across the right leg of the child from second latch plate 134 to second seat bottom aperture 34.

In this secured configuration, second and fourth segments 118, 122 of restraint strap 18 and fourth and fifth segments 166, 168 of adjustment strap 20 cooperate to form the five "points" of harness unit 14 and buckle unit 128 forms the junction of these five "points," as shown in FIGS. 1 and 7.

Moving clockwise around buckle unit 128 starting at first latch plate 132, each of the five "points" is as follows: left shoulder and side sections 74, 76 coupled to first latch plate 132 cooperate to form the first "point," left leg section 178 coupled to first latch plate 132 forms the second "point," the portions of fourth and fifth segments 166, 168 of adjustment strap 20 extending upwardly between the legs of the child from third seat bottom aperture 38 to latch member 136 cooperate to form the third "point," left leg section 178 coupled to second latch plate 134 forms the fourth "point," and right shoulder and side sections 180, 182 coupled to second latch plate 134 cooperate to form the fifth "point."

To remove the secured child from seat 12, the caregiver follows the procedure above for loosening the embrace of the child to develop slack in second and fourth segments 118, 122 of restraint strap 18. Fourth segment 122 of restraint strap 18 is then detached from strap retainer 126 and latch plates 132, 134 are unbuckled from latch member 136 by depressing release button 142. Second and fourth segments 118, 122 are then removed from the shoulders of the child so that the child can be withdrawn from seat 12.

Adjuster 16 ensures that how to adjust the restraint of the child according to the present invention is readily apparent to a caregiver. Adjuster 16 further ensures that obtaining a substantially equal length of strap across each side of the child is readily achieved. At the same time, adjuster 16 minimizes the number of separate parts necessary to manage adjustment of restraint strap 18.

Although the invention has been disclosed in detail with reference to certain preferred embodiments, variations and modifications exist within the scope and spirit of the invention as described and defined in the following claims.

What is claimed is:

1. A child-restraint apparatus comprising
a seat adapted to receive a seated child,
a buckle unit,
a first strap coupled to the buckle unit and configured to lie across and restrain the seated child,
a second strap coupled to the buckle unit, and
an adjuster coupled to the first strap and the second strap to permit adjustment of the first strap across the seated child, further comprising a blocker coupled to the second strap to limit movement of the second strap relative to the seat.

2. The child-restraint apparatus of claim 1, wherein the adjuster includes a strap adjuster portion formed to include at least two slots and a strap anchor portion coupled to the strap adjuster portion, the second strap includes a first portion slidably coupled to the at least two slots of the strap adjuster portion and a second portion coupled to the buckle unit, and the first strap is detachably coupled to the strap anchor portion.

3. The child-restraint apparatus of claim 2, wherein the strap adjuster portion includes three slots that are positioned to lie in spaced-apart parallel relation to one another.

4. The child-restraint apparatus of claim 2, wherein the strap adjuster portion includes at least three sides.

5. The child-restraint apparatus of claim 4, wherein the strap adjuster portion is pentagonally-shaped.

6. The child-restraint apparatus of claim 2, wherein the strap anchor portion includes a first anchor and a second anchor, and the first strap includes a first portion detachably coupled to the first anchor and a second portion detachably coupled to the second anchor.

7. The child-restraint apparatus of claim 6, wherein each of the first and second anchors is J-shaped.

8. The child-restraint apparatus of claim 6, wherein the first and second anchors are coupled to each other so that the strap anchor portion is substantially C-shaped.

9. The child-restraint apparatus of claim 6, wherein the first anchor cooperates with the strap adjuster portion to define a first slot, the second anchor cooperates with the strap adjuster portion to define a second slot, the first portion of the first strap extends through the first slot, and the second portion of the first strap extends through the second slot.

10. The child-restraint apparatus of claim 6, wherein each anchor includes an anchor leg portion coupled to one of the first and second portions of the first strap and an anchor hook portion that curves toward the strap adjuster portion and terminates at a distal end.

11. The child-restraint apparatus of claim 10, wherein each distal end is spaced apart from the strap adjuster portion to form an opening therebetween so that the respective portion of the first strap is movable through the respective opening to attach and detach the respective portion of the first strap to and from the respective anchor leg portion.

12. The child-restraint apparatus of claim 1, wherein the seat includes a front side adapted to receive the seated child and a rear side, the adjuster is positioned to lie along the rear side of the seat, the second strap includes a first portion positioned to lie along the rear side of the seat and a second portion positioned to lie along the front side of the seat, the first portion of the second strap is slidably coupled to the adjuster, and the first strap and the second portion of the second strap are coupled to the buckle unit.

13. The child-restraint apparatus of claim 1, wherein the seat includes a seat back and a seat bottom, the seat back is formed to include at least one aperture through which the first strap extends, the seat bottom is formed to include a first seat bottom aperture and a second seat bottom aperture, the first strap extends through the first seat bottom aperture, and the second strap extends through the second seat bottom aperture.

14. The child-restraint apparatus of claim 1, wherein the first strap includes a pair of shoulder portions and a pair of leg portions, and the shoulder and leg portions are coupled to the buckle unit and configured to embrace the shoulders and legs of the seated child.

15. The child-restraint apparatus of claim 1, wherein the first strap includes a first segment and a second segment, and the adjuster interconnects the first and second straps in a substantially Y-shaped manner such that the first and second segments of the first strap form the top of the Y and the second strap forms the base of the Y.

16. The child-restraint apparatus of claim 15, wherein the adjuster includes a downwardly facing C-shaped strap anchor portion coupled to the first and second segments of the first strap and a pentagonally-shaped strap adjuster portion, and the second strap is coupled to the strap adjuster portion for slidable movement to adjust the restraint strap.

17. The child-restraint apparatus of claim 16, wherein one of the vertices of the pentagonally-shaped strap adjuster portion is coupled to the middle of the C-shaped strap anchor portion, the strap adjuster portion includes three horizontal slots, and the adjustment strap is coupled to the three slots for slidable movement to adjust the restraint strap.

18. A child-restraint apparatus comprising
a seat adapted to receive a seated child,
a restraint strap positioned to lie across and restrain the seated child, the restraint strap including a first segment and a second segment,
an adjustment strap coupled to the restraint strap,
a plate including a C-shaped strap anchor portion and a pentagonally-shaped strap adjuster portion, one of the vertices of the pentagonally-shaped strap adjuster portion being coupled to the middle of the C-shaped strap anchor portion, the plate interconnecting the first and second segments of the restraint strap and the adjustment strap in a substantially Y-shaped manner, the first and second segments of the restraint strap being coupled to the strap anchor portion to form the top of the Y, the adjustment strap being coupled to the strap adjuster portion to form the base of the Y, the strap anchor portion being arranged to form a J-shaped first anchor and a J-shaped second anchor, each of the first and second anchors cooperating with the strap adjuster portion to define a first slanted slot and a second slanted slot, the first segment of the restraint strap extending through the first slanted slot and being coupled to the first anchor, the second segment of the restraint strap extending through the second slanted slot and being coupled to the second anchor, the strap adjuster portion being arranged to form an upper slot, a middle slot, and a lower slot, the adjustment strap being coupled to the upper, middle, and lower slots for slidable movement to adjust the restraint of the seated child, further comprising a strap blocker coupled to the adjustment strap to limit the movement of the adjustment strap relative to the seat and a buckle unit interconnecting the restraint strap and the adjustment strap, and wherein the adjustment strap includes in series a first segment, a second segment, a third segment, and a fourth segment, the first segment extends from an end of the adjustment strap to the plate, the second segment is coupled for slidable movement to the upper, middle, and lower slots of the strap adjuster portion, the third segment extends from the plate to the strap blocker, and the fourth segment extends from the strap blocker to the buckle unit.

19. The child-restraint apparatus of claim 18, further comprising a buckle unit interconnecting the restraint strap and the adjustment strap so that the buckle unit, the restraint strap, the adjustment strap, and the plate cooperate to form a closed loop.

20. The child-restraint apparatus of claim 18, wherein the seat includes a seat back and a seat bottom which cooperate to define a front side and a rear side, the restraint strap further includes a third segment, a fourth segment, and a fifth segment, the first segment extends from the first anchor to the third segment along the rear side, the third segment extends from the first segment to the fourth segment across the left shoulder and thigh of the seated child along the front side, the fourth segment extends from the third segment to the fifth segment transversely along the rear side of the seat bottom, the fifth segment extends from the fourth segment to the second segment across the right shoulder and thigh of the seated child along the front side, and the second segment extends from the fifth segment to the second anchor along the rear side.

21. The child-restraint apparatus of claim 20, wherein the third and fifth segments of the restraint strap are coupled to the buckle unit.

22. The child-restraint apparatus of claim 18, wherein the length of the first segment is inversely proportional to the length of the third segment, decreasing the length of the third segment tightens the restraint strap across the seated child, and increasing the length of the third segment loosens the restraint strap across the seated child.

* * * * *